Patented Oct. 21, 1930

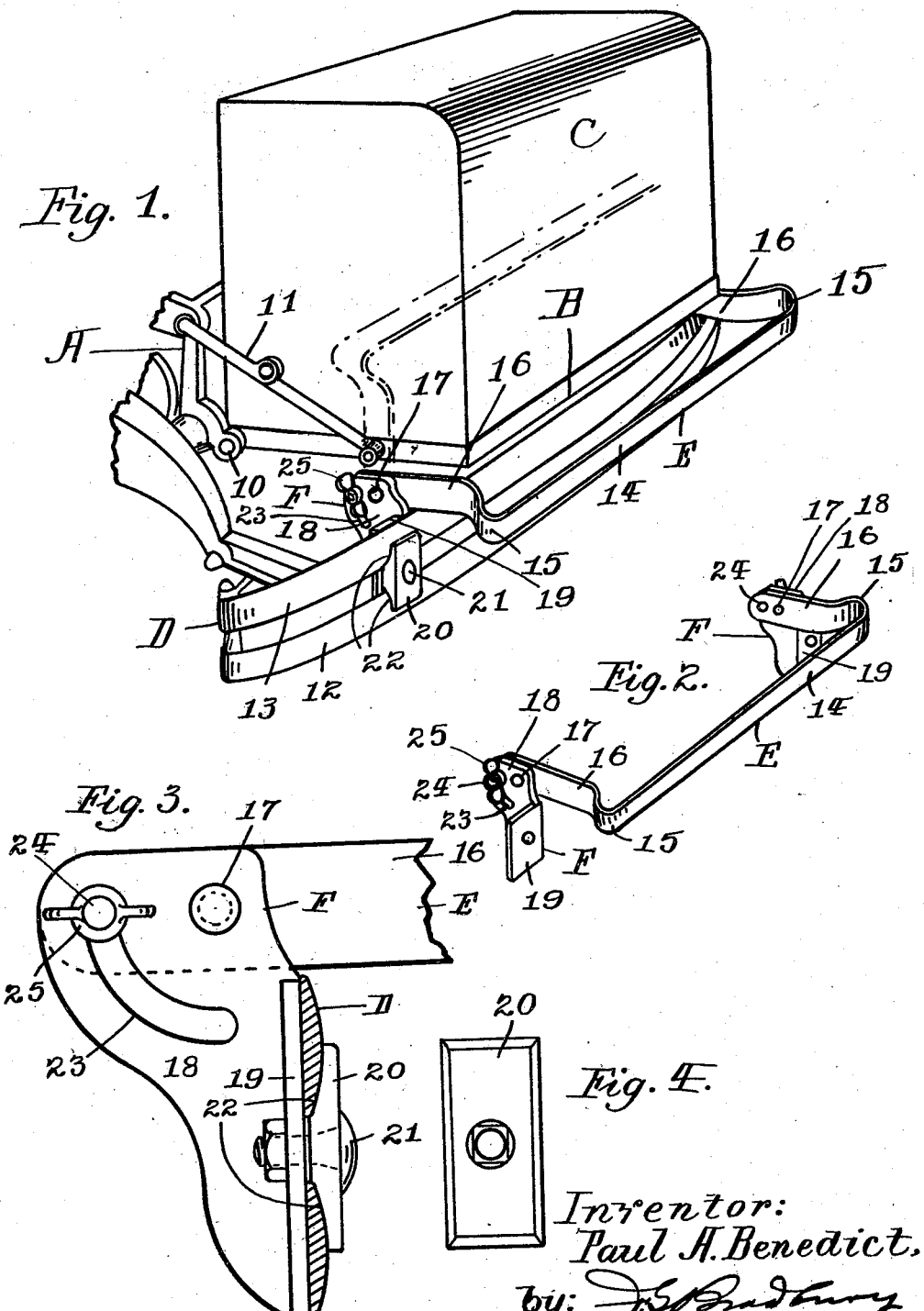

1,778,930

UNITED STATES PATENT OFFICE

PAUL A. BENEDICT, OF LOS ANGELES, CALIFORNIA

FOLDING BUMPER

Application filed August 30, 1929. Serial No. 389,329.

This invention relates to a folding trunk rack guard which is designed to be attached to the main or ordinary bumper and either extend rearwardly to protect an automobile approaching from the rear colliding with and damaging the rack and the trunk or luggage carried thereon or fold up clear of the main bumper when the trunk or luggage is removed and the trunk rack turned up. A further object is simplified construction and greater effectiveness in use.

To these ends my invention comprises the features of construction and combination of parts hereinafter described and claimed. In the accompanying drawing forming part of this specification, Fig. 1 is a perspective view of a portion of the rear end of an automobile equipped with my improvement when in use; Fig. 2 is a perspective view of my improved folding trunk rack guard before it is applied to an automobile for use; Fig. 3 is a side elevation of one of the brackets shown attached to the ordinary bumper, the latter being shown in cross section; and Fig. 4 is a front elevation of the clamp plate removed from one of the brackets.

In the drawing, A indicates a detail portion of the rear end of the chassis of an automobile on which is hinged at 10, to fold up in the usual manner, a horizontal trunk rack B, said rack being supported by the usual foldable arms such as 11. This rack is shown carrying a trunk C but is adapted to carry any other luggage desired. Also mounted upon said chassis is the usual main bumper or guard D, which may be of any construction desired, that shown having a pair of horizontal vertically spaced spring guards 12 and 13, which extend transversely below the trunk rack, when the latter is turned down into the position shown in Fig. 1. It will be noted that when the rack is in the position just noted it extends rearwardly from the main bumper and is not protected thereby, the trunk or other luggage which it carries being exposed and subject to collision from the rear without effective protection.

My invention provides an auxiliary guard or bumper E which extends rearwardly from and protects the trunk rack and which can be folded back out of the way when the rack is not used to perform its function. This auxiliary guard as shown consists of a spring horizontal and transverse guard member 14 which is bent near its opposite ends into a pair of shoulders 15 and a pair of laterally extending supporting arms 16. Each of these supporting arms 16 is hinged near its end by a pintle bolt 17 to the side plate 18 of a bracket F, there being one bracket F for each end of guard E. Said bracket is formed with a supporting flange 19 which is adapted to be fastened to the forward side of the main bumper D by a rectangular washer plate 20 and a bolt 21, the latter passing through the opening between members 12 and 13. Said washer is cupped at 22 to correspond with the convex surfaces of members 12 and 13. The side plate 18 is provided with a slot 23 conforming with an arc described from the axis of the pintle bolt 17 as a center and adapted to admit a clamp bolt 24 passing through the end of one of the supporting arms 16 to hold the guard E either in horizontal position as shown in full lines in Figs. 1, 2 and 3 or in vertical position as indicated by broken lines in Fig. 1, when the trunk C is removed and the trunk rack swung up and forwardly. The wing nut 25 facilitates loosening or tightening the bolt 24.

The brackets it will be noted are secured on the forward side of the main bumper D and the auxiliary guard or bumper E extends over the main bumper and rearwardly sufficiently to fully protect the trunk rack and the trunk or other luggage which it carries from danger of rear end collision. The shoulders 15 also project laterally beyond the sides of said rack sufficiently to render additional protection from collision.

The main bumper and auxiliary guard are both resilient and by combining the two greater resiliency is obtained by the auxiliary guard than if the auxiliary guard were mounted upon a rigid support such as the chassis, which is an advantage.

Changes and modifications in details of construction are contemplated within the scope of the following claims.

Having described my invention, what I claim as new and desire to secure by Letters Patent is:

1. In combination with an automobile chassis having a foldable carrying rack on its rear end and a main bumper across said chassis and below said rack, an auxiliary guard across said rear end and extending rearwardly beyond said rack to protect the latter and its load from rear end collision, the ends of said auxiliary guard being supported from the front side of said main bumper.

2. In combination with an automobile chassis having a luggage carrying rack on its rear end and a main bumper across said chassis and below said rack, said rack being foldably supported to turn forwardly, an auxiliary guard supported from the front side of said main bumper and extending rearwardly beyond said rack and across said rear end to protect the latter when turned down against rear end collision, said auxiliary guard being foldable forwardly into a position ahead of the main bumper when said rack is turned forwardly.

3. In combination with an automobile chassis having a luggage carrying rack on its rear end and a main bumper across said chassis and below said rack, said rack being foldably supported to turn forwardly, an auxiliary guard across said rear end and extending rearwardly beyond said rack to protect the latter when turned down against rear end collision, and a pair of brackets secured to and projecting forwardly from the front side of the main bumper and upon which said auxiliary guard is foldable upwardly ahead of the main bumper when said rack is turned forwardly.

4. In combination with an automobile chassis having a luggage carrying rack on its rear end and a main bumper across said chassis and below said rack, said rack being foldable to turn forwardly, an auxiliary guard across said rear end, extending rearwardly beyond said rack and having laterally protruding ends to protect the rack and its load, a pair of brackets, each of which having a supporting plate secured against the forward side of the main bumper and a forwardly and upwardly projecting side to which the ends of said auxiliary guard are hinged to permit the auxiliary guard swinging forwardly ahead of the main bumper and rearwardly into a position above and back of the main bumper and protecting the rack from rear end collision.

In witness whereof, I have signed my name to this specification.

PAUL A. BENEDICT.